MARY E. GARNHAM.
HAIR CURLING IRONS.

No. 182,521. Patented Sept. 26, 1876.

Witnesses:
Theodore Hoster
B. S. Clark

Inventor:
Mary E. Garnham
By Fitch, Fitch
Attys.

UNITED STATES PATENT OFFICE.

MARY E. GARNHAM, OF CARTHAGE, NEW YORK.

IMPROVEMENT IN HAIR-CURLING IRONS.

Specification forming part of Letters Patent No. 182,521, dated September 26, 1876; application filed April 5, 1876.

*To all whom it may concern:*

Be it known that I, MARY E. GARNHAM, of Carthage, county of Jefferson, in the State of New York, have invented an Improved Curling-Stick for the Hair, of which the following is a full, clear, and exact description, reference being had to the accompanying drawings, forming part of this specification.

My invention relates to a hair-curling instrument in which a hollow tube, for the reception of hot water, is employed to impart heat to the tube; and it consists in the combination, with the said hollow tube, having the opening for the introduction of the hot water in the base or butt end, of a handle-piece, adapted to be screwed upon said base or butt end, and thus to close the water-opening and complete the instrument for use, as hereinafter particularly set forth.

Figure 1:
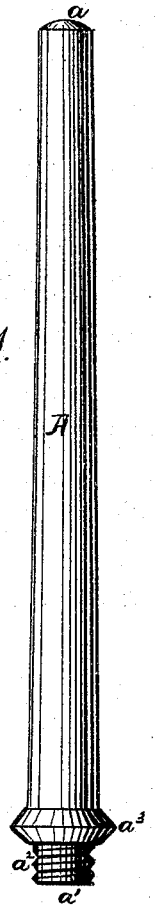
Figure 2:
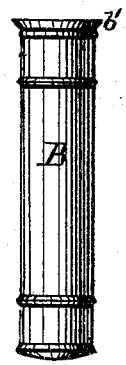
Figure 2:
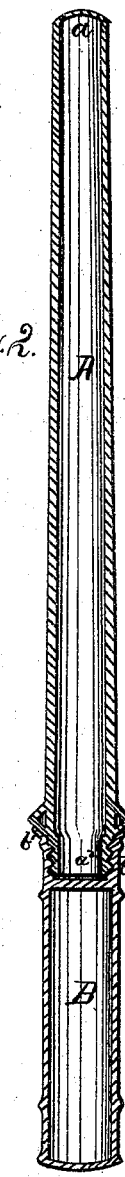

Figure 1 is a side elevation of my improved hair-curling stick, showing the handle detached from the hollow tube. Fig. 2 is longitudinal central sectional view of my device, with the handle and tube united.

A is a hollow tube, which I preferably make of a thin sheet of copper, and form with a closed end, $a$, as shown. The tube is also preferably made to taper somewhat from the base or butt end $a^1$ to the closed end $a$, as shown. This tube may be formed by rolling the thin sheet of metal around a mandrel, and closing the edges by solder or by welding; or the tube may be drawn up in a suitable die. The base or butt end $a^1$ is open, so that communication with the interior of the tube may be had, and is furnished with a teat, having a male screw-thread, as shown at $a^2$, and a circumferential collar or shoulder at the base of the said teat, as shown at $a^3$.

B is a handle-piece, which may be formed of either metal or wood, but preferably of hollow metal, as shown, in order to decrease its weight. This handle is adapted to close the open end $a^1$ of the tube A, by means of a cap arranged in one end of the handle, and provided with a female screw-thread, as shown at $b$. This cap is provided with a circumferential flange at its extreme edge, as seen at $b'$, arranged to fit upon and against the shoulder $a^3$ on the tube.

Now it is evident that the tube A may be filled with hot water through the open base or butt end $a^1$, and, being thus filled, that the said open end may be closed and the instrument completed, in proper condition for use, by the handle B, the cap $b$ in the end of which will screw down over the teat $a^2$, and the flange $b'$ will fit against the collar $a^3$.

I do not claim, broadly, a hollow curling-tube adapted to receive and retain a supply of hot water as a heating medium, as I am aware that this device is not new. I intend to limit my claim hereunder to the specific invention I have shown and described, which consists in the combination, with a hollow tube, having the opening for the introduction of hot water in the base or butt end, of a handle-piece, holding a cap, and adapted to close the open base or butt end, and thus complete the instrument for use.

What I claim as my invention, and desire to secure by Letters Patent, is—

In a hair-curling iron, the combination, with the hollow tube A, having the open base or butt end $a^1$, provided with a teat, $a^2$, and circumferential collar $a^3$, of the handle-piece B, having the cap $b$ and circumferential flange $b'$, arranged to operate as described, and for the purpose specified.

MARY E. GARNHAM.

Witnesses:
L. D. THOMPSON,
GEO. S. SYLVESTER.